United States Patent [19]

Eilingsfeld et al.

[11] 4,250,090
[45] Feb. 10, 1981

[54] 2-AMINO-5-ARYLAZOARYLAZOTHIAZOLE COMPOUNDS

[75] Inventors: Heinz Eilingsfeld, Frankenthal; Guenter Hansen; Guenther Seybold, both of Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 24,248

[22] Filed: Mar. 27, 1979

[30] Foreign Application Priority Data

Apr. 15, 1978 [DE] Fed. Rep. of Germany ....... 2816507

[51] Int. Cl.³ .................. C09B 31/14; D06P 1/39; D06P 3/06; D06P 3/32
[52] U.S. Cl. ................................ 260/158; 548/190
[58] Field of Search ................................ 260/158

[56] References Cited

U.S. PATENT DOCUMENTS 3,816,391  6/1974  Coates et al. ................ 260/158
4,124,581  11/1978  Vor der Bruck et al. .......... 260/158

Primary Examiner—Floyd D. Higel

Attorney, Agent, or Firm—Oblon, Fisher, Spivak, McClelland & Maier

[57] ABSTRACT

Acid azo dyes containing thiazole coupling components, of the general formula

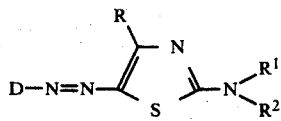

where
D is the radical of a diazo component,
R is hydrogen, acetyl, benzoyl or an aliphatic, cycloaliphatic, aromatic or heterocyclic radical,
$R^1$ and $R^2$ independently of one another are optionally substituted alkyl, cycloalkyl, aralkyl or aryl,
$R^1$ may also be hydrogen and
$R^1$ and $R^2$ together with the nitrogen may be a heterocyclic radical, and
the radicals D, R, $R^1$ and/or $R^2$ may in total contain from 1 to 4 —SO₃H groups.

The deeply colored novel compounds are particularly suitable for dyeing polyamides, and the dyeings obtained have very good lightfastness and wetfastness.

5 Claims, No Drawings

2-AMINO-5-ARYLAZOARYLAZOTHIAZOLE COMPOUNDS

The present invention provides novel compounds of the general formula I

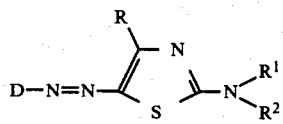

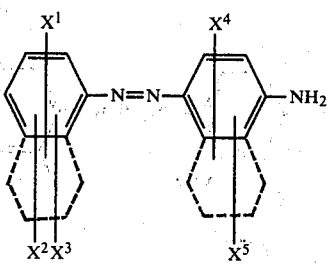

where
- D is the radical of a diazo component,
- R is hydrogen, C-acyl or an aliphatic, cycloaliphatic, aromatic or heterocyclic radical,
- $R^1$ and $R^2$ independently of one another are optionally substituted alkyl, cycloalkyl, aralkyl or aryl, and
- $R^1$ may also be hydrogen, or
- $R^1$ and $R^2$ together with the nitrogen form a heterocyclic radical, and the molecule contains from 1 to 4 —$SO_3H$ groups in the radicals D, R, $R^1$ and/or $R^2$.

Radicals D may in particular be derived from compounds of the aniline, aminonaphthalene, aminoanthraquinone or aminophthalimide series or from heterocyclic compounds such as thiazoles, benzthiazoles, benzisothiazoles, indazoles or pyrazoles.

Examples of suitable substituents for radicals D of the aromatic series (i.e. aniline, aminonaphthalene, aminoanthraquinone and aminophthalimide series) are fluorine, chlorine, bromine, trifluoromethyl, $C_1$-$C_4$-alkyl, $C_1$-$C_4$ alkoxy, hydroxyl, amino, $C_1$-$C_4$-alkanoylamino, benzoylamino, $C_1$-$C_4$-monoalkylamino and -dialkylamino, carboxyl, $C_1$-$C_4$-alkoxycarbonyl, nitro, cyano, carbamoyl, sulfamoyl, $C_1$-$C_4$-alkylsulfonyl and phenylsulfonyl.

Examples of suitable substituents for heterocyclic radicals D are nitro, cyano, chlorine, bromine, carboxyl, hydroxyl, $C_1$-$C_4$-alkoxycarbonyl and carbamoyl.

Preferred diazo components correspond to the general formula where
- $X^1$ is hydrogen, fluorine, chlorine, bromine, nitro, cyano, methylsulfonyl, ethylsulfonyl, hydroxyl, carboxyl, $C_1$-$C_4$-alkoxycarbonyl, carbamoyl, methyl, ethyl, methoxy, ethoxy, sulfamoyl or hydroxysulfonyl,
- $X^2$ is hydrogen, chlorine, bromine, nitro, cyano or hydroxysulfonyl,
- $X^3$ is hydrogen, chlorine, bromine or hydroxysulfonyl,
- $X^4$ is hydrogen, chlorine, methyl, ethyl, methoxy, ethoxy, $C_1$-$C_4$-alkanoylamino, hydroxyl or hydroxysulfonyl,
- $X^5$ is hydrogen, methyl, ethyl, methoxy or ethoxy, and the dotted lines represent optional aromatic rings fused to the benzene rings shown.

Specific examples of diazo components $DNH_2$ are aniline, o-, m- and p-chloroaniline, o-, m- and p-bromoaniline, o-, m- and p-nitroaniline, o-, m- and p-toluidine, o-, m- and p-anisidine, o-, m- and p-phenetidine, o-, m- and p-ethylaniline, 2-chloro-4-aminotoluene, 4-chloro-2-aminotoluene, 6-chloro-2-aminotoluene, 5-amino-1,4-dimethylbenzene, 2-chloro-5-methoxyaniline, 2-chloro-5-ethoxyaniline, 2,5-dichloroaniline, 3,4-dichloroaniline, 2,4-dichloroaniline, 2,6-dichloroaniline, 1-aminobenzene-2-sulfonic acid, 1-aminobenzene-3-sulfonic acid, 1-aminobenzene-4-sulfonic acid, 2,5-dichloro-1-aminobenzene-4-sulfonic acid, 2,6-dibromo-1-aminobenzene-4-sulfonic acid, 1-aminobenzene-2,4-disulfonic acid, 1-aminobenzene-2,5-disulfonic acid, 2-chloro-1-aminobenzene-4-sulfonic acid, 2-chloro-1-aminobenzene-5-sulfonic acid, 4-chloro-1-aminobenzene-5-sulfonic acid, 4-nitro-1-aminobenzene-2-sulfonic acid, 2-nitro-1-aminobenzene-4-sulfonic acid, 1-aminobenzene-2-carboxylic acid, 5-sulfo-2-amino-benzoic acid and

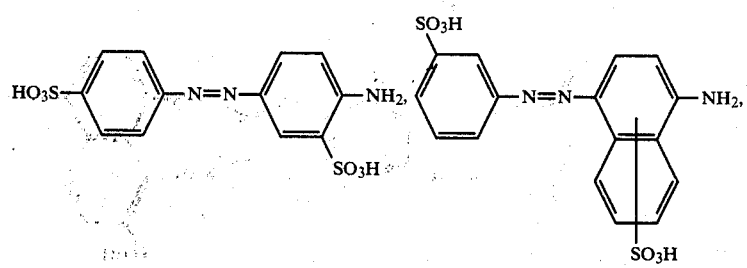

-continued
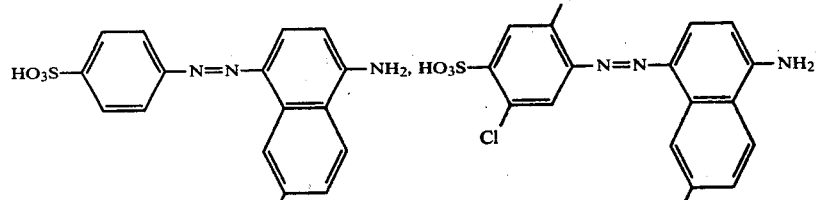
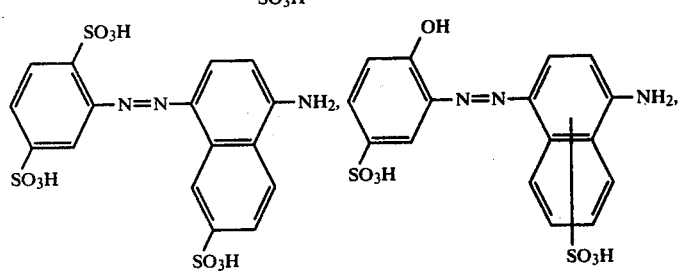
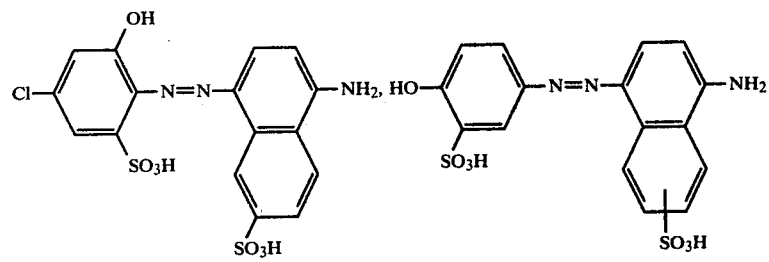
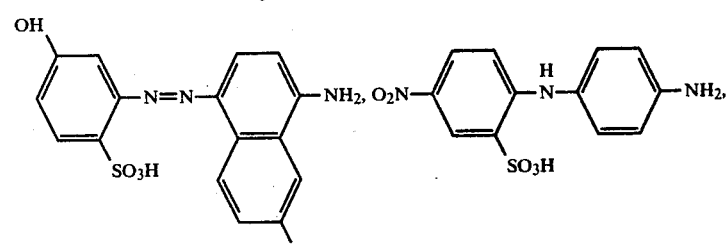
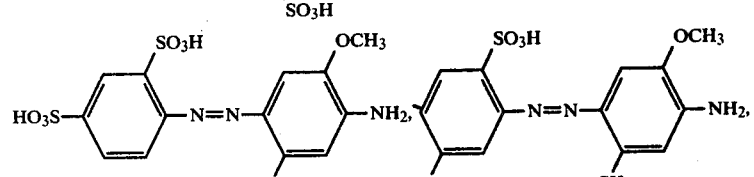
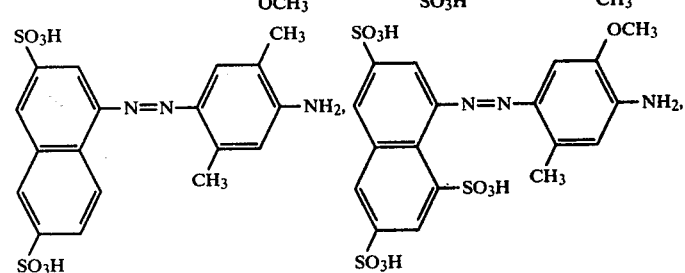
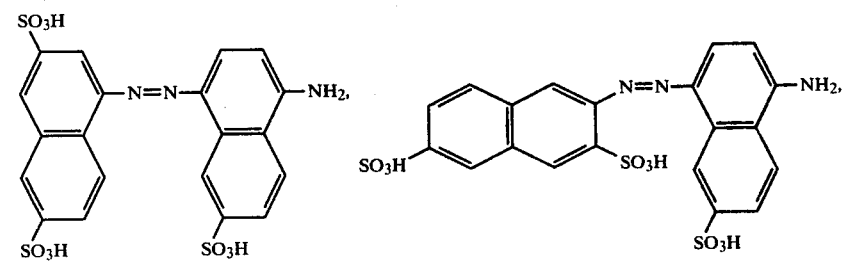

-continued
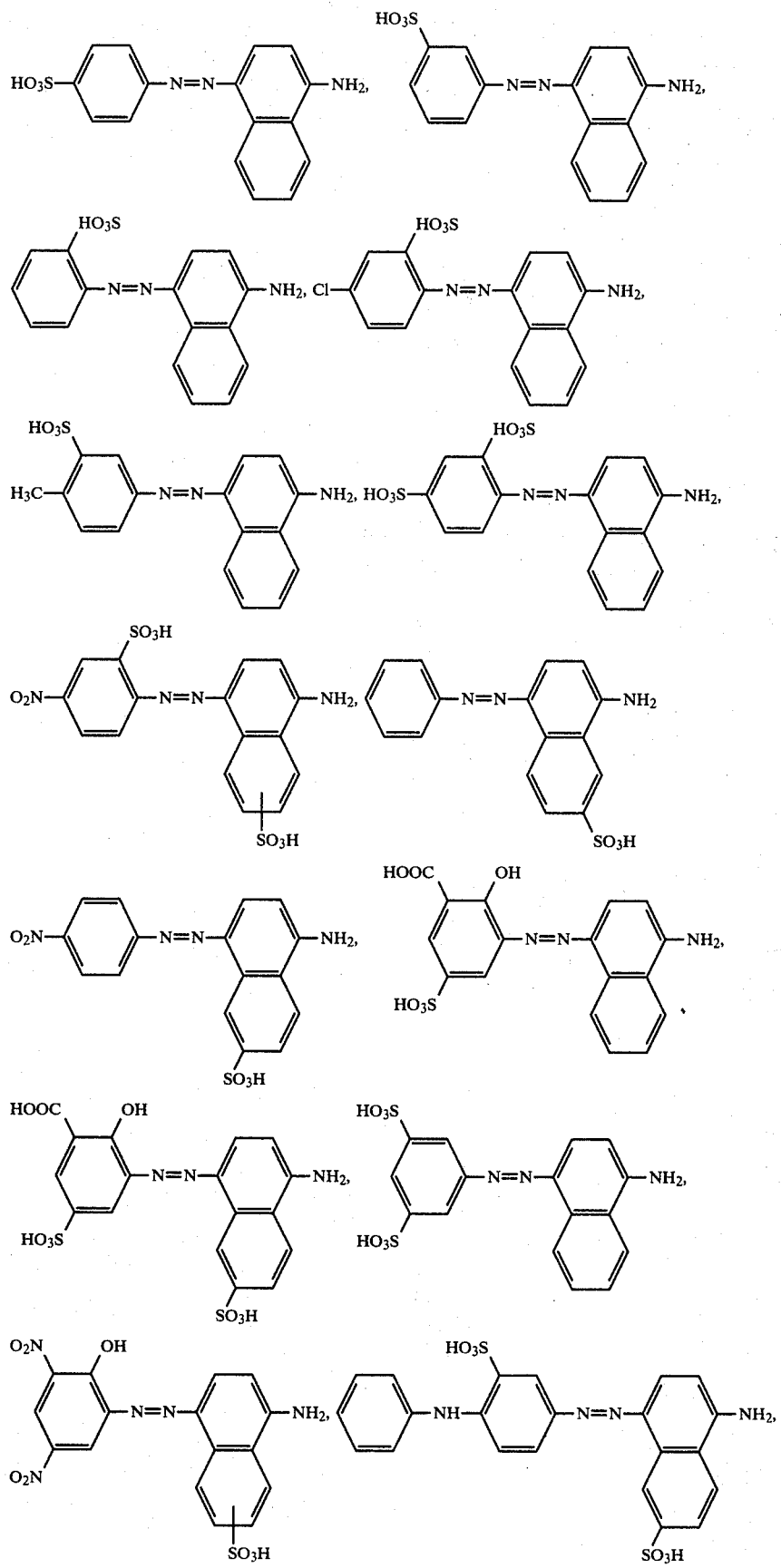

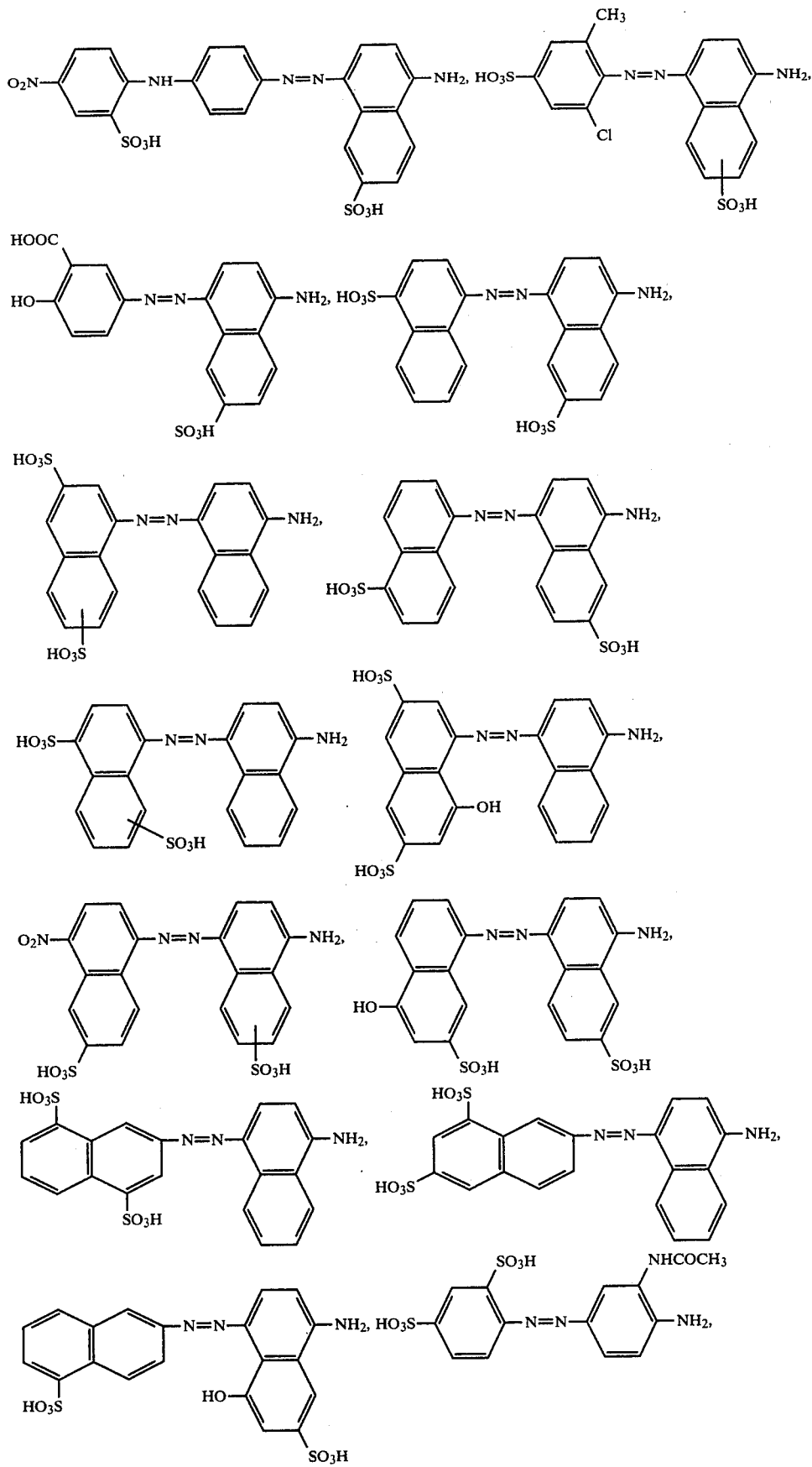

-continued
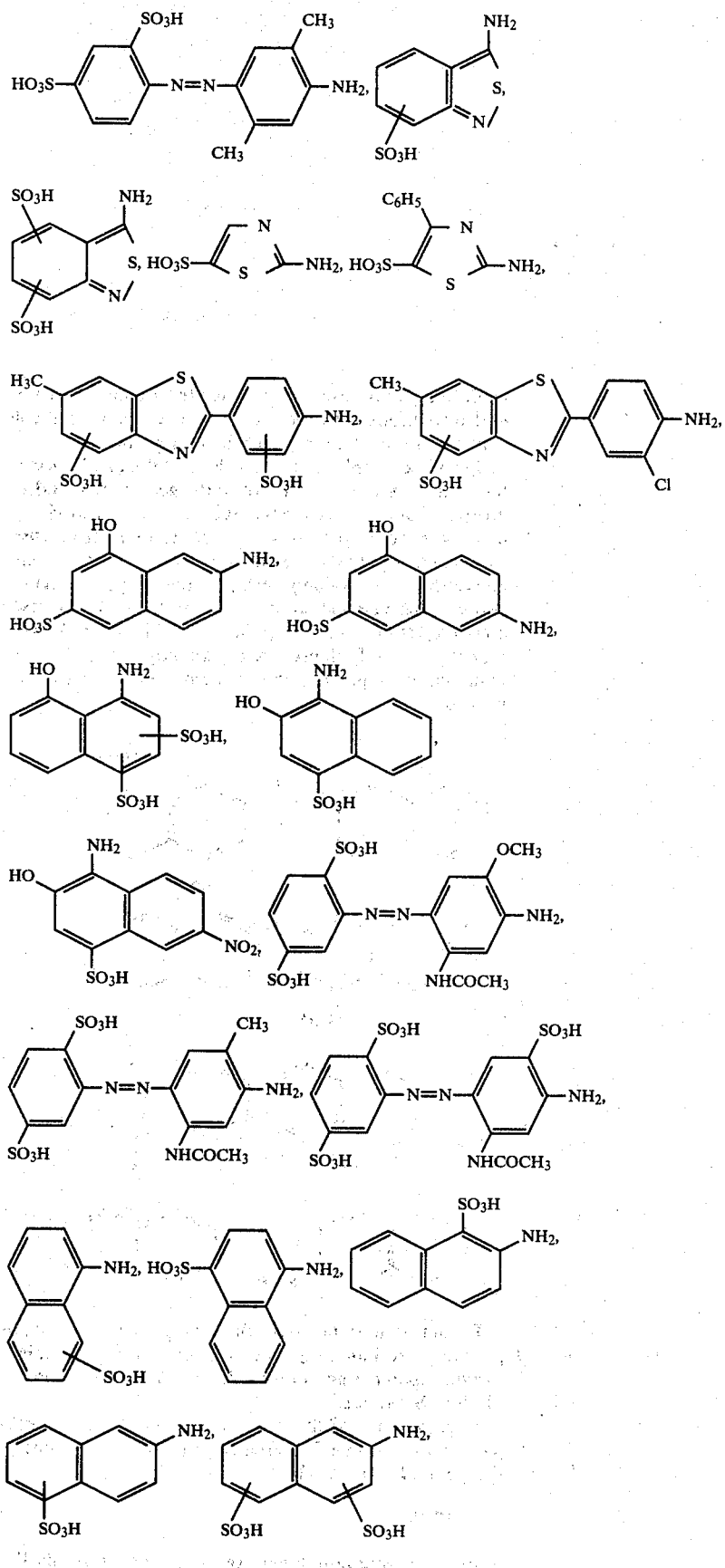

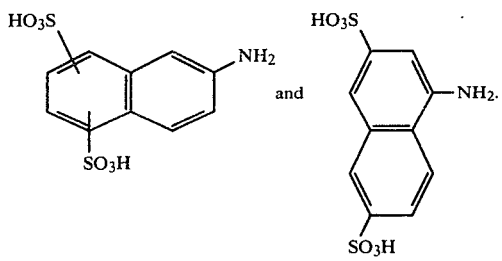

-continued

Examples of radicals R are acetyl, benzoyl, $C_1-C_4$-alkyl which is unsubstituted or substituted by chlorine, bromine, cyano, hydroxyl, $C_1-C_4$-alkoxy, $C_1-C_4$-alkoxycarbonyl, $C_1-C_4$-alkylmercapto, phenoxy, sulfophenoxy, phenylmercapto, amino, N-mono- or N,N-di-$C_1-C_4$-alkylamino, phenylamino, sulfophenylamino, $C_1-C_4$-alkanoylamino or sulfoethylamino, vinyl, cyclohexyl, and phenyl, thienyl and thiazolyl which are unsubstituted or substituted by fluorine, chlorine, bromine, hydroxyl, $C_1-C_4$-alkoxy, $\beta$-$C_1-C_4$-alkanoyloxyethoxy, $\beta$-cyanoethoxy, $\beta$-carboxylethoxy, $\beta$-$C_1-C_4$-alkoxycarbonylethoxy, phenoxy, sulfophenoxy, $C_1-C_4$-alkylmercapto, phenylmercapto, amino, $\beta$-$C_1-C_4$-alkanoylamino, benzoylamino, $C_1-C_4$-monoalkylamino or -dialkylamino, phenylamino, sulfophenylamino, $C_1-C_4$-alkylsulfonylamino, phenylsulfonylamino and hydroxysulfonyl.

Specific examples of radicals R are: $CH_3$, $C_2H_5$, $CH_2Cl$, $CH_2CN$, $CH_2OH$, $CH_2-CH_2Cl$, $CH_2-CH_2OH$, $CH_2-CH_2CN$, $CH_2-COOCH_3$, $CH_2COOC_2H_5$, $CH_2-COOH$, $CH_2-NHC_2H_4SO_3H$, $-CH_2OCH_3$, $-CH_2OCH_3$, $-CH_2OC_2H_5$, $CH_2SCH_3$, $CH_2N(CH_3)_2$, $C_6H_5OCH_2$, $HO_3SC_6H_4OCH_2$, $C_6H_5$, $ClC_6H_4$, $BrC_6H_4$, $FC_6H_4$, $Cl_2C_6H_3$, $CH_3C_6H_4$, $(CH_3)_2C_6H_3$, $CH_3OC_6H_4$, $C_2H_5OC_6H_4$, $NCC_2H_4OC_6H_4$, $CH_3OOC.C_2H_4OC_6H_4$, $HOOC-C_2H_4OC_6H_4$, $H_2NCOC_2H_4OC_6H_4$, $CH_3COOC_2H_4OC_6H_4$, $HOC_2H_4OC_6H_4$, $HOC_6H_4$, $C_6H_5OC_6H_4$, $HO_3SC_6H_4-OC_6H_4$, $CH_3SC_6H_4$, $C_6H_5SC_6H_4$, $NC-C_2H_4SC_6H_4$, $CH_3CONHC_6H_4$, $C_2H_5CONHC_6H_4$, $H_2N-C_6H_4$, $HOC_2H_4NHC_6H_4$, $(C_2H_5)_2NC_6H_4$, $CH_3SO_2NHC_6H_4$, $C_6H_5SO_2NHC_6H_4$, $C_6H_5NHC_6H_4$, $CH_3CONHC_6H_3SO_3H$, $CH_3OC_6H_3SO_3H$,

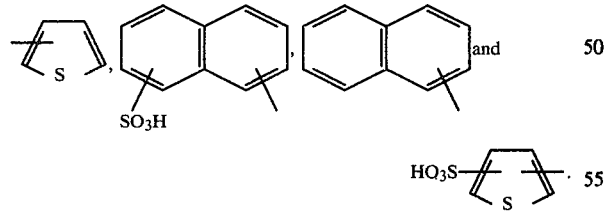

Examples of radicals $R^1$ and $R^2$ are $C_1-C_8$-alkyl radicals which may be interrupted by oxygen and substituted by hydroxyl, carboxyl, cyano, chlorine, bromine, phenyl, $C_1-C_8$-alkoxy, $C_1-C_4$-alkanoyloxy, $C_1-C_4$-alkoxycarbonyl, $C_1-C_4$-alkanoylamino, acetyl, $C_1-C_4$-alkylaminocarbonyloxy, arylamino-carbonyloxy, $C_1-C_4$-alkoxycarbonyloxy or phenoxycarbonyloxy, allyl, methallyl, propargyl, cyclohexyl, phenyl-$C_1-C_5$-alkyl or phenyl or naphthyl which are unsubstituted or substituted by fluorine, chlorine, bromine, $C_1-C_4$-alkoxycarbonyl, carboxyl, nitro or $C_1-C_4$-alkanoylamino. All aromatic radicals, which preferably contain phenyl or naphthyl groups, can, in the above list, be substituted by hydroxysulfonyl; furthermore, the aliphatic radicals may carry one or more sulfonic acid groups.

Specific examples of radicals $R^1$ and $R^2$, in addition to those already mentioned, are hydrogen, methyl, ethyl, propyl, butyl, $\beta$-hydroxyethyl, $\beta$-methoxyethyl, $\gamma$-methoxypropyl, $\beta$-cyanoethyl, $\beta$-carbomethoxyethyl, $\beta$-carboethoxyethyl, $\beta$-acetoxyethyl, $\beta$-ethoxycarbonylethyl, $\gamma$-acetylaminopropyl, phenoxycarbonyloxyethyl, phenylaminocarbonyloxyethyl, butylaminocarbonyloxyethyl, benzyl, $\beta$-phenylethyl, phenyl, sulfophenyl, disulfophenyl, acetylaminophenyl, carboxyphenyl, cyanophenyl, chlorophenyl and sulfoethyl, as well as

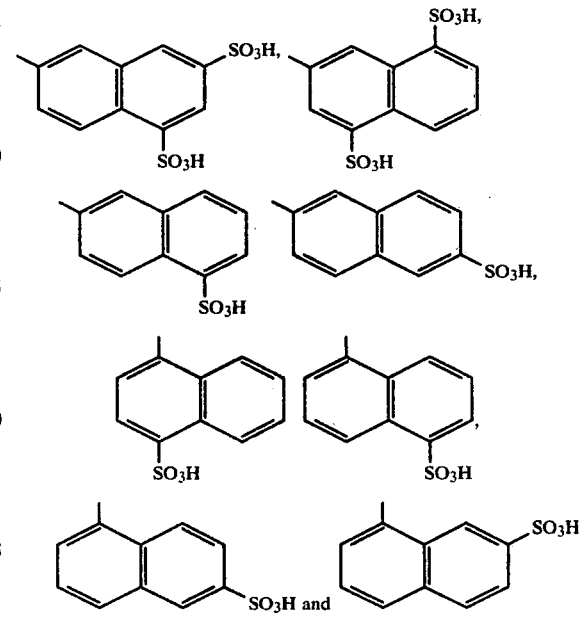

$R^1$ and $R^2$ together with the nitrogen may for example the pyrrolidino, piperidino, morpholino, piperazino, $\alpha$-methylpiperazino, hexamethyleneimino or thiomorpholino-S-dioxide.

A compound of the general formula I may be prepared by reacting a diazonium compound of an amine of the general formula III $$DNH_2 \qquad III$$

with a coupling component of the general formula IV

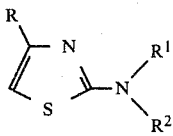

Some sulfo-group-containing dyes of the general formula I can also be prepared by sulfonating corresponding dyes which are free from sulfo groups, or contain fewer sulfo groups.

Compounds of the general formula IV containing one or more sulfo groups are novel; they may contain the $SO_3H$ group or groups in one or both of the radicals R and $R^1$, whilst $R^2$ is hydrogen. These coupling components may be prepared by reacting a compound of the general formula

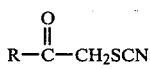

with a primary amine of the general formula $H_2N-R^1$ to give a compound of the general formula

Depending on the starting components, the $SO_3H$ group or groups may be present in one or both of the radicals R and $R^1$, the presence of $SO_3H$ in $R^1$ being preferred.

The methods of preparation of the dyes are known in principle. Details may be found in the Examples, where parts and percentages are by weight unless stated otherwise.

The preferred use of the compounds of the general formula I is for dyeing nitrogen-containing fibers, eg. wool, silk and especially nylons. Some of the compounds may also be used for dyeing leather.

The dyeings are distinguished by good lightfastness and wetfastness, such as fastness to water, perspiration, brine and fulling treatments. The high tinctorial strength of the compounds of the general formula I also deserves special mention.

Compounds of particular industrial importance are those of the general formula I a

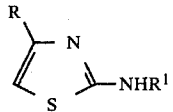

where $D^1$ is phenyl or naphthyl substituted by arylazo,

B is $C_1-C_4$-alkyl, $\beta$-carboxymethyl or phenyl which is unsubstituted or substituted by chlorine, bromine, methyl, ethyl, $C_1-C_4$-alkoxy, $\beta$-cyanoethoxy, $\beta$-carboxyethoxy, phenoxy, sulfophenoxy, $C_1-C_4$-alkanoylamino, phenylamino, sulfophenylamino or hydroxysulfonyl, and $B^1$ and $B^2$ independently of one another are $C_1-C_8$-alkyl, $C_2-C_8$-alkyl which is substituted by hydroxyl, carboxyl, hydroxysulfonyl, cyano, phenyl, $C_1-C_8$-alkoxy, phenoxy, $C_1-C_4$-alkanoyloxy, $C_1-C_4$-alkoxycarbonyl, $C_1-C_4$-alkanoylamino or $C_1-C_4$-alkoxycarbonyloxy, allyl, phenyl-$C_1-C_5$-alkyl or phenyl or naphthyl which are unsubstituted or substituted by chlorine, bromine, $C_1-C_4$-alkyl, $C_1-C_4$-alkoxy, cyano, carbamoyl or hydroxysulfonyl.

EXAMPLE 1

A. Preparation of 4-phenyl-2-(3-sulfophenylamino)-thiazole 132 parts of phenacyl thiocyanate, 38 parts of zinc chloride and 129 parts of 1-aminobenzene-3-sulfonic acid are together stirred with 750 parts of water for 20 hours at the boil. After the mixture has cooled, the product is filtered off and dried.

Yield: 224 parts (about 90% of theory).

4-Phenyl-2-(4-sulfophenylamino)-thiazole can be prepared similarly, in about 80% yield.

B. Preparation of the Dye 17.3 Parts of 1-aminobenzene-3-sulfonic acid are dissolved in 100 parts of water and sufficient 5 N sodium hydroxide solution to give a neutral mixture, and after adding an aqueous solution of 6.9 parts of sodium nitrite, the batch is added dropwise to a mixture of 100 parts of water, 100 parts of ice and 60 parts of 5 N hydrochloric acid at 0°-5° C., whilst stirring. After 1 hour, the excess nitrite is destroyed with amidosulfonic acid, and a solution of 22.3 parts of a mixture of 1-naphthylamine-6-and -7-sulfonic acid in 200 parts of water and 8 parts of 50% strength sodium hydroxide solution is then added in the course of 30 minutes. Thereafter, the pH is raised to 2.5 by means of dilute sodium hydroxide solution. After completion of coupling, the monoazo dye is dissolved by means of sodium hydroxide solution, to give a final pH of 6-7, and after adding an aqueous solution of 7.0 parts of sodium nitrite the batch is added to a mixture of 150 parts of ice, 100 parts of water and 80 parts of 5 N hydrochloric acid, whilst stirring. The diazotization is complete after about 4 hours at from 10° to 15° C. The excess nitrite is destroyed with amidosulfonic acid and a solution of 35 parts of 4-phenyl-2-(3-sulfophenylamino)-thiazole in 400 parts of water and 8 parts of 50% strength sodium hydroxide solution is added dropwise to the suspension of the diazonium salt. The batch is then brought to a pH of 10 with dilute sodium hydroxide solution. After completion of coupling, the disazo dye is salted out at a pH of 7-8 by means of 200 parts of potassium chloride, and is filtered off and dried under reduced pressure at 60° C.

A dark powder is obtained, which corresponds to the formula

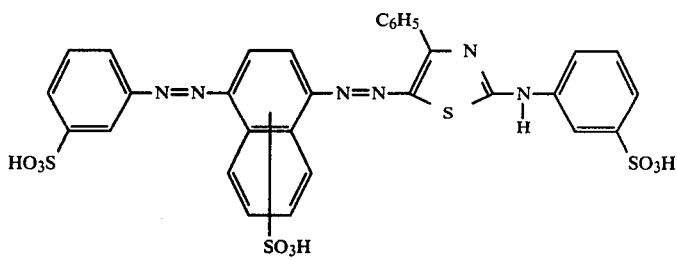

and gives reddish dark blue dyeings, having good lightfastness and wetfastness, on nylon 6.

The dyes characterized by their substituents in the Table which follows can be prepared similarly to Example 1 and give dyeings in blue hues, having similar properties to the above.

| Example | D¹ | B | B¹ | B² |
|---|---|---|---|---|
| 2 | 2-SO₃H, 7-SO₃H naphthyl azo phenyl (o-SO₃H) | C₆H₅ | m-SO₃H phenyl | H |
| 3 | 7-SO₃H naphthyl azo phenyl (p-SO₃H) | " | " | H |
| 4 | 7-SO₃H naphthyl azo phenyl (2-Br, 4-SO₃H) | " | " | H |
| 5 | 7-SO₃H naphthyl azo phenyl (2-Cl, 4-SO₃H) | " | " | H |

-continued $$D^1-N=N-\underset{S}{\overset{B}{\underset{\|}{C}}}\underset{}{\overset{N}{\underset{}{C}}}-N\underset{B^2}{\overset{B^1}{}}$$

| Example | D¹ | B | B¹ | B² |
|---------|----|----|-----|-----|
| 6 | 2,5-dichloro-4-sulfophenyl-N=N-(4-methyl-7-sulfo-1-naphthyl) | " | " | H |
| 7 | 4-sulfophenyl-N=N-(3-ethoxy-4-methyl-7-sulfo-1-naphthyl) | " | " | H |
| 8 | 2,5-dichloro-4-sulfophenyl-N=N-(4-methyl-sulfo-naphthyl) | " | " | H |
| 9 | 4-sulfophenyl-N=N-(4-methyl-7-sulfo-1-naphthyl) | " | 4-sulfophenyl | H |
| 10 | " | | 4-methylphenyl | H |
| 11 | " | | 4-methoxyphenyl | H |
| 12 | 4-nitro-2-sulfophenyl-N=N-(4-methyl-7-sulfo-1-naphthyl) | | 4-chlorophenyl | H |

-continued
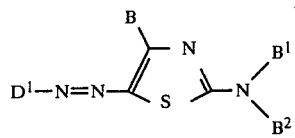
| Example | D¹ | B | B¹ | B² |
|---|---|---|---|---|
| 13 | 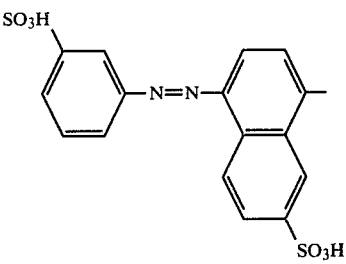 | 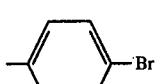 | 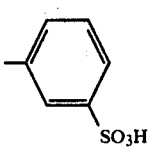 | H |
| 14 | 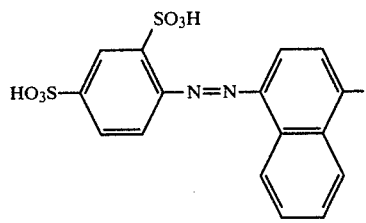 | $C_6H_5$ | " | H |
| 15 | 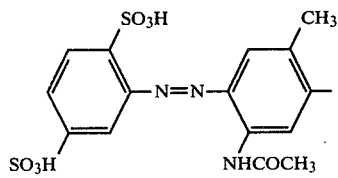 | " | " | H |
| 16 | 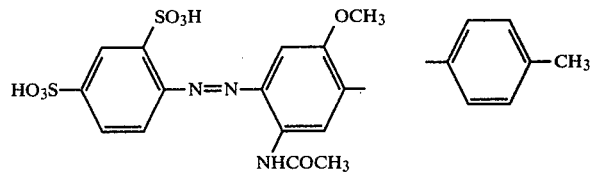 | " | 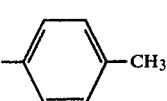 | H |
| 17 | 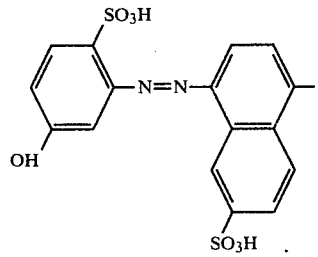 | " | " | H |
| 18 | 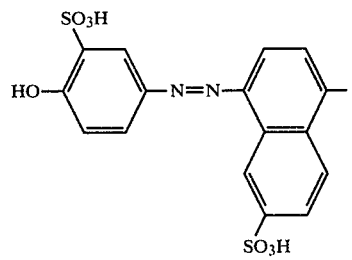 | " | " | H |

-continued

| Example | D¹ | B | B¹ | B² |
|---|---|---|---|---|
| 19 | ![HO3S-benzene(Br,Br)-N=N-naphthalene(CH3)(SO3H)] | " | " | H |

EXAMPLE 20

40.7 parts of the monoazo compound prepared by diazotizing 1-aminobenzene-3-sulfonic acid and coupling with 1-aminonaphthalene-6/7-sulfonic acid are added to a solution of 8.0 parts of sodium hydroxide in 900 parts of water at 50° C., and the mixture is stirred until all has dissolved. It is then cooled to 0° C. and a solution of 7.0 parts of sodium nitrite in 30 parts of water is added, followed dropwise by 25.4 parts of concentrated hydrochloric acid in 60 parts of water. The mixture is stirred for 4 hours at 0°-5° C., the excess nitrous acid is removed with amidosulfonic acid and a solution of 30 parts of 4-(4'-acetylaminophenyl)-2-(N-diallylamino)-thiazole in 50 parts of dimethylformamide and 25 parts of water is then run into the diazonium salt suspension.

The pH is then raised to 4 with aqueous sodium acetate solution. After completion of coupling, the disazo dye is salted out with potassium chloride at 40° C., filtered off and dried under reduced pressure at 60° C. The dye has the formula

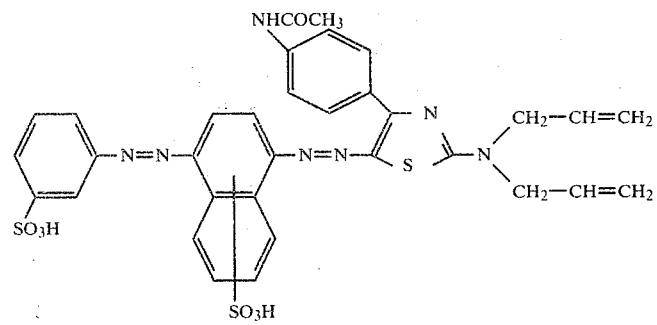

and dyes nylon in lightfast and wetfast navy hues.

The dyes characterized by their substituents in the Table which follows can be prepared similarly to Example 20 and also give dyeings in blue hues, having similar properties to the above.

| Example | D¹ | B | B¹ | B² |
|---|---|---|---|---|
| 21 | ![HO3S-phenyl-N=N-naphthalene(SO3H)] | ![phenyl-NHCOCH3] | CH₂CH=CH₂ | CH₂CH=CH₂ |

-continued
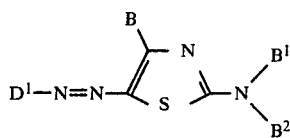
| Example | D¹ | B | B¹ | B² |
|---|---|---|---|---|
| 22 | 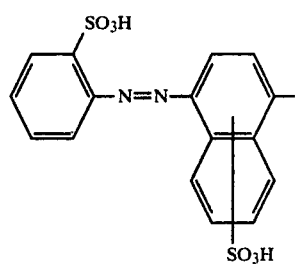 | " | " | " |
| 23 | 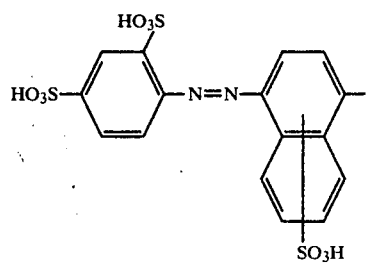 | $C_6H_5$ | $C_2H_5$ | $C_6H_5$ |
| 24 | 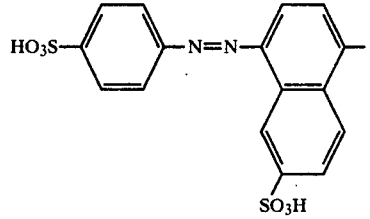 | " | $CH_2CH=CH_2$ | $CH_2CH=CH_2$ |
| 25 | " | " | $C_2H_5$ | $C_2H_5$ |
| 26 | " | 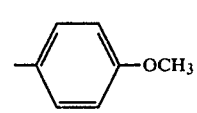 | " | " |
| 27 | " | 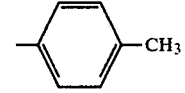 | " | " |
| 28 | " |  | " | " |
| 29 | 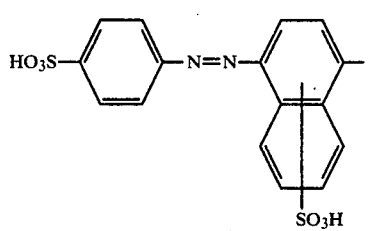 | 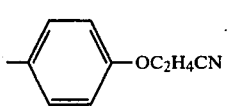 | $CH_2CH=CH_2$ | $CH_2CH=CH_2$ |
| 30 | " | 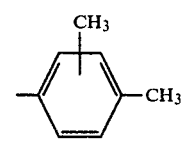 | $C_2H_5$ | $C_2H_5$ |

-continued

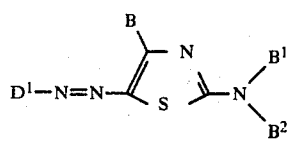

| Example | D¹ | B | B¹ | B² |
|---|---|---|---|---|
| 31 | 2,5-dichloro-4-sulfophenyl-azo-(4-methyl-naphthalene-SO₃H) [HO₃S, Cl, Cl substituents on phenyl; naphthalene with SO₃H] | C₆H₅ | '' | '' |
| 32 | 4-hydroxy-2-sulfophenyl-azo-(4-methyl-naphthalene-SO₃H) | -C₆H₄-CH₃ (p-tolyl) | '' | '' |
| 33 | 2,5-disulfophenyl-azo-(4-methyl-7-sulfonaphthalene) | -C₆H₄-NHCOCH₃ (p-acetamidophenyl) | '' | '' |
| 34 | '' | C₆H₅ | -C₆H₄-SO₃H | H |
| 35 | 2,5-disulfophenyl-azo-(2,5-dimethoxyphenyl) | '' | '' | H |
| 36 | 2,4-disulfophenyl-azo-(5-methoxy-2-methylphenyl) | '' | -C₆H₄-SO₃H (meta) | H |
| 37 | 2,4-disulfophenyl-azo-(4-methyl-2-acetamidophenyl) | '' | -C₆H₄-SO₃H (para) | H |

-continued

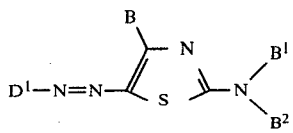

| Example | D¹ | B | B¹ | B² |
| --- | --- | --- | --- | --- |
| 38 | naphthalene with SO₃H (2 positions) and azo-linked dimethoxyphenyl (OCH₃ at 2 and 5 positions) | " | " | H |
| 39 | naphthalene with two SO₃H and azo-linked phenyl bearing OCH₃ and two CH₃ | " | " | H |

EXAMPLE 40

A. Preparation of 4-methyl-2-(4-sulfophenylamino)-thiazole 173 parts of 1-aminobenzene-4-sulfonic acid in 1,000 parts of 50% strength alcohol are stirred with 115 parts of thiocyanato-acetone for 5 hours at the boil. The reaction mixture is then cooled to room temperature and the product is filtered off and dried under reduced pressure at 60° C.

Yield: 255 parts (about 94% of theory).

4-Methyl-2-(3-sulfophenylamino)-thiazole can be prepared analogously, in about 93% yield.

B. Preparation of the dye 40.7 Parts of the monoazo dye obtained from 1-aminobenzene-4-sulfonic acid and 1-aminonaphthalene-6-sulfonic acid are diazotized as described in Example 1. A solution of 27.0 parts of 4-methyl-2-(3-sulfophenylamino)-thiazole in 200 parts of water and 8 parts of 50% strength sodium hydroxide solution is then added to the diazo suspension. The reaction mixture is then brought to a pH of about 4 with aqueous sodium acetate solution. After completion of coupling, the disazo dye is salted out with potassium chloride, filtered off and dried under reduced pressure at 60° C. The dye, which has the formula

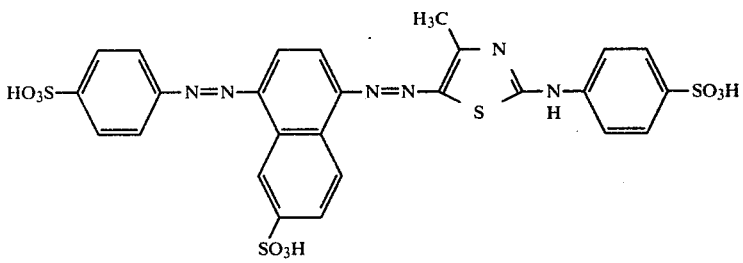

dyes nylon in reddish blue hues having good lightfastness and wetfastness.

The dyes characterized in the Table which follows can be prepared similarly to Example 40 and give blue dyeings having similar properties to the above.

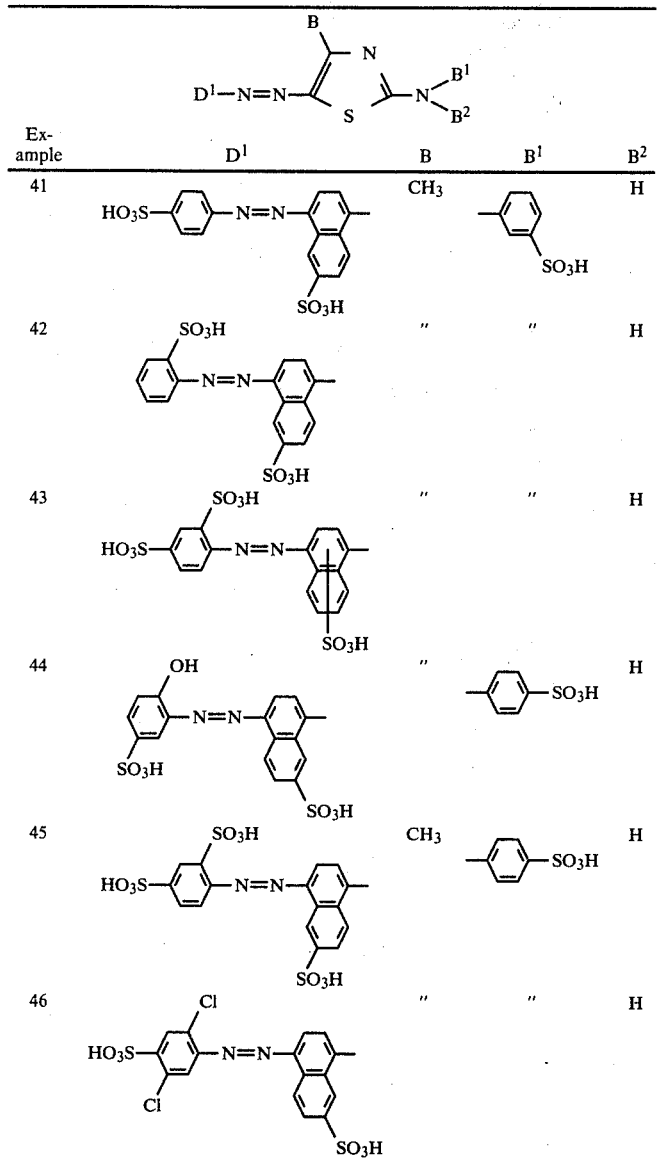

EXAMPLE 47

12.8 Parts of o-chloroaniline are dissolved in 50 parts of water and 50 parts of 5 N hydrochloric acid and after adding 100 parts of ice the diazotization is carried out with a solution of 6.9 parts of sodium nitrite at 0°–5° C., whilst stirring. After about 10 minutes, a slight excess of nitrous acid is destroyed with a small amount of amidosulfonic acid, and the diazonium salt solution is then added, in the course of 15 minutes, to a solution of 22.3 parts of 1-naphthylamine-6-sulfonic acid in 140 parts of water and 3.2 parts of sodium carbonate. The pH of the mixture is then raised to 4.0 with sodium carbonate. After completion of coupling, the pH is brought to 12 with sodium hydroxide solution and after adding 40 parts of sodium chloride the intermediate formed is filtered off. The filter cake is stirred into 200 parts of water, a solution of 7.5 parts of sodium nitrite is added, and the batch is then stirred into a mixture of 200 parts of ice and 30 parts of 32% strength hydrochloric acid. After about 4 hours at 10°–15° C., the excess nitrous acid is removed and a solution of 35 parts of 4-phenyl-2-(3-sulfophenylamino)-thiazole in 400 parts of water and 8 parts of 50% strength sodium hydroxide solution is added.

The pH is then raised to 9 with sodium hydroxide solution. After completion of coupling, the pH of the batch is returned to 7 with dilute hydrochloric acid.

300 Parts of potassium chloride are then added, the mixture is heated to 60° C., and the product is filtered off and dried at 60° C. under reduced pressure. A dark powder of the formula

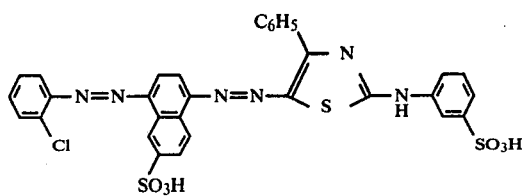

is obtained, which dyes nylon and other polyamide fibers in navy hues having good washfastness and lightfastness.

The dyes characterized in the Table which follows can be prepared similarly to Example 47 and give blue dyeings having similar properties to the above.

| Example | D | B | B¹ | B² |
|---|---|---|---|---|
| 48 | 3-Cl-C₆H₄- | C₆H₅ | 3-SO₃H-C₆H₄- | H |
| 49 | 4-Cl-C₆H₄- | " | " | H |
| 50 | 2-Cl-5-CH₃-C₆H₃- | " | 4-SO₃H-C₆H₄- | H |
| 51 | 3-Cl-4-OCH₃-C₆H₃- | " | " | H |
| 52 | 3-Cl-4-OC₂H₅-C₆H₃- | 4-CH₃-C₆H₄- | " | H |
| 53 | 2,3-Cl₂-C₆H₃- | C₆H₅ | " | H |
| 54 | 2,4-Cl₂-C₆H₃- | " | " | H |
| 55 | 2-OC₂H₅-C₆H₄- | " | " | H |
| 56 | 2-CH₃-C₆H₄- | C₆H₅ | 3-SO₃H-C₆H₄- | H |
| 57 | 3-CH₃-C₆H₄- | " | " | H |
| 58 | 2-OCH₃-C₆H₄- | 4-CH₃-C₆H₄- | " | H |
| 59 | 4-Br-C₆H₄- | " | " | H |

-continued

| | | B N B¹ | | |
| | D—N=N— ... —N=N— ... N | | | |
| | HO₃S | | | |
| Example | D | B | B¹ | B² |
|---|---|---|---|---|
| 60 | 2,4-dimethylphenyl (CH₃, CH₃) | " | " | H |
| 61 | phenyl | " | —C₆H₄—SO₃H | H |
| 62 | " | —C₆H₄—NHCOOH₃ | " | H |

EXAMPLE 63

24.2 Parts of 1-amino-2,5-dichlorobenzene-4-sulfonic acid are diazotized as described in Example 1. A solution of 35 parts of 4-phenyl-2-(3-sulfophenylamino)-thiazole in 400 parts of water and 8 parts of 50% strength sodium hydroxide solution is added to the nitrite-free suspension of the diazonium salt, whilst stirring. The batch is then brought to a pH of 7-8 with dilute sodium hydroxide solution. After completion of coupling, the monoazo dye is salted out with 100 parts of potassium chloride, filtered off and dried under reduced pressure at 60° C. The dye, which has the formula

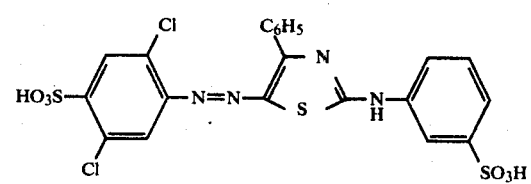

dyes nylon 6 in bluish red hues having good lightfastness and wetfastness.

The dyes summarized in the Table which follows can be prepared similarly to Example 63 and give dyeings having similar properties.

| | | B N B¹ | | | |
| | D—N=N— ... S ... N | | | | |
| Example | D | B | B¹ | B² | Hue |
|---|---|---|---|---|---|
| 64 | 2,5-dichloro-4-sulfophenyl (HO₃S, Cl, Cl) | C₆H₅ | —C₆H₄—SO₃H | H | bluish red |
| 65 | " | " | —C₆H₄—CH₃ | H | " |
| 66 | 2,6-dibromo-4-sulfophenyl (HO₃S, Br, Br) | " | " | H | " |
| 67 | 4-sulfophenyl (HO₃S—) | " | " | H | orange |
| 68 | 2,5-disulfophenyl (SO₃H, SO₃H) | " | " | H | " |
| 69 | 4-nitro-2-sulfophenyl (O₂N—, SO₃H) | —C₆H₄—Cl | —C₆H₄—SO₃H | H | brown |

-continued

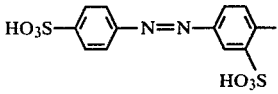

| Example | D | B | B¹ | B² | Hue |
|---|---|---|---|---|---|
| 70 |  | $C_6H_5$ | " | H | violet |
| 71 | 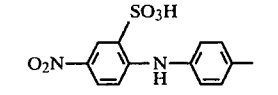 | $C_6H_5$ |  | H | red |
| 72 | 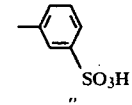 | " | " | H | orange |
| 73 |  | " | 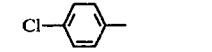 | H | violet |
| 74 | 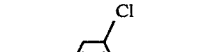 | " | " | H | orange |
| 75 | 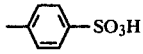 |  | " | H | red |

EXAMPLE 76

24.2 Parts of 1-amino-2,5-dichlorobenzene-4-sulfonic acid are stirred into 100 parts of a mixture of glacial acetic acid and propionic acid (volume ratio 17:3) and are diazotized, at 5° C., with an aqueous solution of 7 parts of sodium nitrite. The diazotization is complete after about 2.5 hours and the excess nitrite is destroyed with a small amount of urea. 26.5 Parts of 4-phenyl-2-(phenylamino)-thiazole are then introduced, in portions. As the coupling progresses, the reaction mixture becomes viscous, and is diluted with 200 parts of glacial acetic acid. The coupling is complete after about 1 hour. The batch is diluted with 2,000 parts of water and briefly heated at 60° C., the product is filtered off and washed with a small amount of water, and the filter cake is dried under reduced pressure at 60° C. The resulting monoazo dye, which has the formula

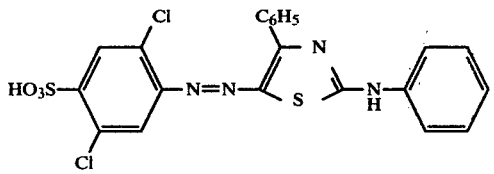

dyes nylon 6 in bluish red hues having good fastness characteristics.

The dyes listed in the Table which follows can be prepared similarly to Example 76.

| Example | D | B | B¹ | B² | Hue |
|---|---|---|---|---|---|
| 77 |  | $C_6H_5$ | $C_6H_5$ | H | orange |
| 78 |  | " | " | H | " |
| 79 |  | " |  | " | H | " |

-continued
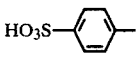
| Example | D | B | B¹ | B² | Hue |
|---|---|---|---|---|---|
| 80 | 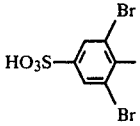 | " | " | H | " |
| 81 |  | 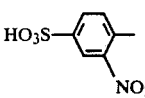 | " | H | " |
| 82 | 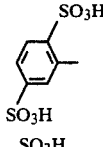 | $C_6H_5$ | " | H | " |
| 83 | 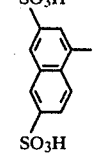 | " | " | H | " |
| 84 | 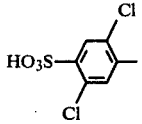 | " | " | H | " |
| 85 | 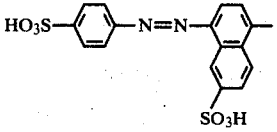 | " | $CH_2CH=CH_2$ | $CH_2CH=CH_2$ | |
The following dyes may also be prepared similarly.
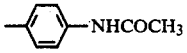
| Example | D¹ | B | B¹ | B² |
|---|---|---|---|---|
| 86 | 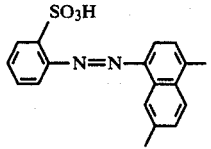 | 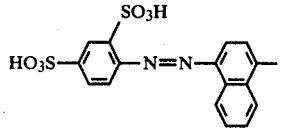—NHCOCH₃ | $C_2H_5$ | $C_4H_9$ |
| 87 | " | " | $C_3H_7$ | $C_3H_7$ |
| 88 | (SO₃H, SO₃H naphthyl-N=N-) | " | $C_4H_9$ | $C_4H_9$ |
| 89 | (HO₃S, SO₃H-phenyl-N=N-naphthyl) | " | $C_2H_5$ | $C_2H_5$ |

-continued

Structure heading:
$$D^1-N=N-\underset{S}{\overset{B}{C}}=\underset{}{\overset{N}{C}}-N\begin{matrix}B^1\\B^2\end{matrix}$$

| Example | D¹ | B | B¹ | B² |
|---|---|---|---|---|
| 90 | 4-(HO₃S-naphthyl)-N=N-(4-methylnaphthyl with SO₃H) | " | " | " |
| 91 | 4-(naphthyl-2,6-di-SO₃H)-N=N-(4-methylnaphthyl) | " | CH₂CH=CH₂ | CH₂CH=CH₂ |
| 92 | HO₃S-C₆H₄-N=N-(4-methylnaphthyl) | 4-SO₃H-3-NHCOCH₃-phenyl | C₂H₅ | C₂H₅ |
| 93 | 2,4-(HO₃S)₂-C₆H₃-N=N-(4-methylnaphthyl) | 4-SO₃H-3-NHCOCH₃-phenyl | C₂H₅ | C₂H₅ |
| 94 | (1,6-di-HO₃S-naphth-2-yl)-N=N-(4-methylnaphthyl) | 4-NHCOCH₃-phenyl | C₂H₅ | C₂H₅ |
| 95 | (4-HO-6-SO₃H-naphth)-N=N-(4-methyl-2-SO₃H-naphthyl) | " | " | " |
| 96 | (4,8-di-HO₃S-5-OH-naphth)-N=N-(4-methylnaphthyl) | " | " | " |
| 97 | (2-OH-3,5-di-HO₃S-phenyl)-N=N-(4-methylnaphthyl) | 4-NHCOC₂H₅-phenyl | " | " |
| 98 | (2-OH-3-HOOC-5-HO₃S-phenyl)-N=N-(4-methyl-SO₃H-naphthyl) | " | CH₂CH=CH₂ | CH₂CH=CH₂ |
| 99 | 2,4-di-HO₃S-C₆H₃-N=N-(4-methyl-SO₃H-naphthyl) | 4-NHCOC₃H₇-phenyl | C₂H₅ | C₂H₅ |
| 100 | " | 4-NHCOCH₂CH₂COOH-phenyl | " | C₄H₉ |

-continued $$\underset{D^1-N=N}{\overset{B}{\|}}\underset{S}{\overset{N}{\bigvee}}\underset{N}{\overset{B^1}{\diagdown}}B^2$$

| Example | D¹ | B | B¹ | B² |
|---------|----|----|----|----|
| 101 | " | 4-CH₃-C₆H₄-NH-C(=N-N=C(OCH₃)-N=C(OCH₃)-)- (dimethoxy triazine hydrazone) | " | " |
| 102 | " | 4-CH₃-C₆H₄-NH-C(=N-N=C(NH₂)-N=C(NH₂)-)- (diamino triazine hydrazone) | " | " |
| 103 | 4-HO₃S-C₆H₄-N=N-(4-methyl-6-sulfo-naphth-1-yl) | C₆H₅ | 4-methyl-naphth-1-yl-SO₃H | H |
| 104 | " | " | 4-methyl-naphth-2,6-disulfonyl | " |
| 105 | HO₃S-C₆H₄-N=N-(4-methylnaphth-1-yl) | " | 6-methyl-naphth-2-SO₃H (6,7) | " |
| 106 | HO₃S-C₆H₄-N=N-(4-methylnaphth-1-yl) | C₆H₅ | 6-methyl-naphth-2,4-disulfonyl | H |
| 107 | " | " | 6-methyl-naphth-1,5-disulfonyl (1-SO₃H, 5-SO₃H) | " |

We claim:

1. A light fast and wet fast acid azo-dye containing a thiazole coupling component and having the formula:

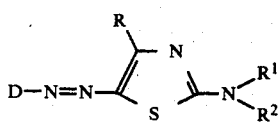

wherein D is phenyl or naphthyl substituted by arylazo, R is C₁-C₄-alkyl, β-carboxymethyl, or phenyl which is unsubstituted or substituted by chlorine, bromine, methyl, ethyl, C₁-C₄-alkoxy, β-cyanoethyl, β-carboxylethoxy, phenoxy, sulophenoxy, C₁-C₄-alkanoylamino, phenylamino, sulfophenylamino, sulfoethylamino, or hydroxysulfonyl and R¹ and R² independently of one another are C₁-C₈-alkyl, C₂-C₈-alkyl which is substituted by hydroxyl, carboxyl, hydroxysulfonyl, cyano, phenyl, C₁-C₈-alkoxy, phenoxy, C₁-C₄-alkanoyloxy, C₁-C₄-alkoxycarbonyl, C₁-C₄-alkanoylamino or C₁-C₄-alkoxycarbonyloxy, allyl, phenyl-C₁-C₅-alkyl or phenyl which is unsubstituted or substituted by chlorine, bromine, C₁-C₄-alkyl, C₁-C₄-alkoxy, cyano, carbamoyl, or hydroxysulfonyl.

2. The azo dye of claim 1, of the formula:

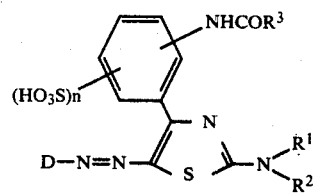

where
n is 0 or 1,
R³ is C₁-C₄-alkyl and
D, R¹ and R² have the meanings given in claim 1.

3. A light fast and wet fast acid azo dye containing a thiazole coupling component and having the formula:

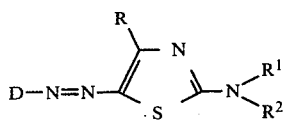

wherein D is phenyl or naphthyl substituted by arylazo, R is acetyl; benzoyl; $C_1$-$C_4$-alkyl; $C_1$-$C_4$ alkyl substituted by chlorine, bromine, cyano, hydroxyl, $C_1$-$C_4$-alkoxy, $C_1$-$C_4$-alkoxycarbonyl, $C_1$-$C_4$-alkylmercapto, phenoxy, sulfophenoxy, phenylmercapto, amino, N-mono- or N,N-di-$C_1$-$C_4$-alkylamino, phenylamino, sulfophenylamino, $C_1$-$C_4$-alkanoylamino or sulfoethylamino; vinyl; cyclohexyl; phenyl; thienyl; thiazolyl; or phenyl, thienyl or thiazolyl substituted by fluorine, chlorine, bromine, hydroxyl, $C_1$-$C_4$-alkoxy, $\beta$-$C_1$-$C_4$-alkanoyloxyethoxy, $\beta$-cyanoethoxy, $\beta$-carboxylethoxy, $\beta$-$C_1$-$C_4$-alkoxycarbonylethoxy, phenoxy, sulfophenoxy, $C_1$-$C_4$-alkylmercapto, phenylmercapto, amino, $\beta$-$C_1$-$C_4$-alkanoylamino, benzolyamino, $C_1$-$C_4$-monoalkylamino or -dialkylamino, phenylamino, sulfophenylamine, $C_1$-$C_4$-alkylsulfonylamino, phenylsulfonylamino or hydroxysulfonyl; $R^1$ and $R^2$ independently are hydrogen; $C_1$-$C_8$-alkyl; $C_1$-$C_8$-alkyl interrupted by oxygen and substituted by hydroxyl, carboxyl, cyano, chlorine, bromine, phenyl, $C_1$-$C_8$-alkoxy, $C_1$-$C_4$-alkanoyloxy, $C_1$-$C_4$-alkoxycarbonyl, $C_1$-$C_4$-alkanoylamino, acetyl, $C_1$-$C_4$-alkylaminocarbonyloxy, arylamino-carbonyloxy, $C_1$-$C_4$-alkoxycarbonyloxy or phenoxycarbonyloxy; allyl; methallyl; propargyl; cyclohexyl; phenyl-$C_1$-$C_5$-alkyl; phenyl; naphthyl; or phenyl or naphthyl substituted by fluorine, chlorine, bromine, $C_1$-$C_4$-alkoxycarbonyl, carboxyl, nitro or $C_1$-$C_4$-alkanoylamino; or $R^1$ and $R^2$ together with the nitrogen atom are pyrrolidino, piperidino, morpholino, piperazino, $\alpha$-methylpiperazino, hexamethyleneimino or thiomorpholino-S-dioxide; and wherein the molecule contains from 1 to 4 —$SO_3H$ groups in at least one of the D, R, $R^1$ and $R^2$ radicals.

4. The acid azo dye of claim 2, wherein said radical R is $CH_3$, $C_2H_5$, $CH_2Cl$, $CH_2CN$, $CH_2OH$, $CH_2$—$CH_2Cl$, $CH_2$—$CH_2OH$, $CH_2$—$CH_2CN$, $CH_2$—$COOCH_3$, $CH_2COOC_2H_5$, $CH_2$—$COOH$, $CH_2$—$NHC_2H_4SO_3H$, —$CH_2OCH_3$, —$CH_2OC_2H_5$, $CH_2SCH_3$, $CH_2N(CH_3)_2$, $C_6H_5OCH_2$, $HO_3SC_6H_4OCH_2$, $C_6H_5$, $ClC_6H_4$, $BrC_6H_4$, $FC_6H_4$, $Cl_2C_6H_3$, $CH_3C_6H_4$, $(CH_3)_2C_6H_3$, $CH_3OC_6H_4$, $C_2H_5OC_6H_4$, $NCC_2H_4OC_6H_4$, $CH_3OOC.C_2H_4OC_6H_4$, $HOOC$—$C_2H_4OC_6H_4$, $H_2NCOC_2H_4OC_6H_4$, $CH_3COOC_2H_4OC_6H_4$, $HOC_2H_4OC_6H_4$, $HOC_6H_4$, $C_6H_5OC_6H_4$, $HO_3SC_6H_4$—$OC_6H_4$, $CH_3SC_6H_4$, $C_6H_5SC_6H_4$, $NC$—$C_2H_4SC_6H_4$, $CH_3CONHC_6H_4$, $C_2H_5CONHC_6H_4$, $H_2N$—$C_6H_4$, $HOC_2H_4NHC_6H_4$, $(C_2H_5)_2NC_6H_4$, $CH_3SO_2NHC_6H_4$, $C_6H_5SO_2NHC_6H_4$, $C_6H_5NHC_6H_4$, $CH_3CONHC_6H_3SO_3H$, $CH_3OC_6H_3SO_3H$,

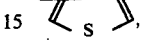, 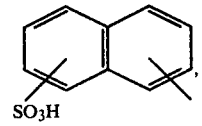

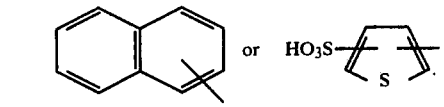

5. The acid azo dye of claim 2, wherein said radicals $R^1$ and $R^2$ are each hydrogen, methyl, ethyl, propyl, butyl, $\beta$-hydroxyethyl, $\beta$-methoxyethyl, $\gamma$-methoxypropyl, $\beta$-cyanoethyl, $\beta$-carbomethoxyethyl, $\beta$-carboethoxyethyl, $\beta$-acetoxyethyl, $\beta$-ethoxycarbonylethyl, $\gamma$-acetylaminopropyl, phenoxycarbonyloxyethyl, phenylaminocarbonyloxyethyl, butylaminocarbonyloxyethyl, benzyl, $\beta$-phenylethyl, phenyl, sulfophenyl, disulfophenyl, acetylaminophenyl, carboxyphenyl, cyanophenyl, chlorophenyl, sulfoethyl,

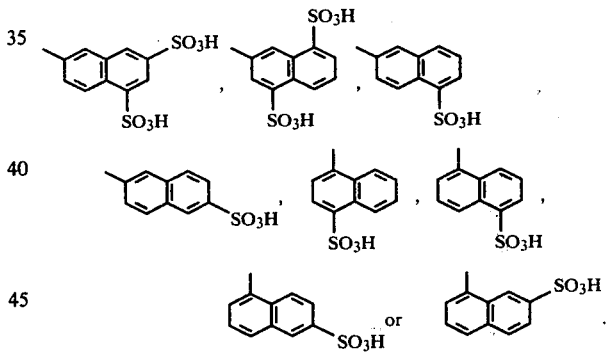

* * * * *